Feb. 17, 1970  A. R. LONG ET AL  3,496,262
METHOD FOR PRODUCING EMBOSSED PLASTIC ARTICLES
Filed Jan. 4, 1968

INVENTORS:
ALFRED R. LONG
GEORGE A. VIEHMANN
BY
THEIR ATTORNEYS

United States Patent Office 3,496,262
Patented Feb. 17, 1970

3,496,262
METHOD FOR PRODUCING EMBOSSED PLASTIC ARTICLES
Alfred R. Long, Acton, Ontario, Canada, and George A. Viehmann, New Providence, N.J., assignors to Construction Specialties, Inc., Cranford, N.J., a corporation of New Jersey
Filed Jan. 4, 1968, Ser. No. 695,800
Int. Cl. B29d 7/02; B44c 1/24
U.S. Cl. 264—177        5 Claims

ABSTRACT OF THE DISCLOSURE

A method for making embossed strips of extruded thermoplastic resins such as vinyl resins to close manufacturing tolerances in which heated plastic is extruded in the form of a strip with an undercut portion or rib which must be controlled closely in its cross-sectional dimensions, the rib and adjacent surfaces of the strip being cooled by immersion in a bath of liquid while the remainder of the strip, in a plastic state, is passed in contact with an embossing roll to apply a pattern to it, the entire strip thereafter being cooled by immersion in a bath of liquid to prevent flow or recovery of the plastic from marring the pattern applied by the embossing roll.

---

This invention relates to the production of articles from thermoplastic resins, such as vinyl resins, having an embossed surface with a sharply defined pattern and other portions thereof having closely controlled dimensions.

It has been proposed heretofore to emboss the surfaces of sheets of thermoplastic material by means of embossing drums, belts or combinations of the same and many different types of products have been made by such procedures and apparatuses. The sheets so made and the patterns or designs embossed thereon have not required sharpness of detail or control within close tolerances and, accordingly no real difficulty is encountered in producing them with the equipment currently available. However, when it is desired to produce a sharply defined pattern such as knurling, checkering or the like, the normal recovery flow of the plastic dulls the sharpness of the pattern and mars its effect and usefulness. Moreover, the normal shrinkage of the plastic during cooling and the recovery flow of the plastic has prevented the production, by extrusion, of products having precisely controlled dimensions.

In accordance with the present invention, a method is provided whereby extruded thermoplastic products can be obtained with sharply defined patterns and closely controlled dimensions.

More particularly, in accordance with the invention, a method is provided including an extrusion device for extruding a heated thermoplastic material in the form of a strip of a predetermined cross-section and having on one surface a rib or the like, the dimensions of which must be controlled within close limits and having another surface adapted to be embossed with a clearly defined pattern, the ribbed portion of the strip being subjected immediately after extrusion to cooling to set it in its predetermined shape by immersing it in a cooling liquid while supporting the remainder of the strip so that an embossing roller or the like can emboss a pattern on a surface of the strip while it is still in a thermoplastic condition and thereafter immersing the entire strip in a cooling liquid to prevent the pattern from being marred by the memory effect or flow of the thermoplastic material. In this way, strips suitable for application to gratings or grilles of the type disclosed in the Viehmann et al. application Ser. No. 514,485 filed Dec. 17, 1965 now Patent No. 3,383,822 can be provided which can be attached securely to the grating bars and which will have a well-defined non-skid pattern exposed to traffic and wear.

The immediate cooling of the rib portion adapted to interlock with the grating bar preserves its shape and controls its dimensions so that it is not deformed during the embossing operation while nevertheless enabling another surface of the strip to be deformed into the desired non-skid or other pattern.

For a better understanding of the present invention, reference may be had to the accompanying drawings, in which FIGURE 1 is a top plan view of apparatus shown partially broken away embodying the present invention for forming extruded embossed strips;

Figure 1:
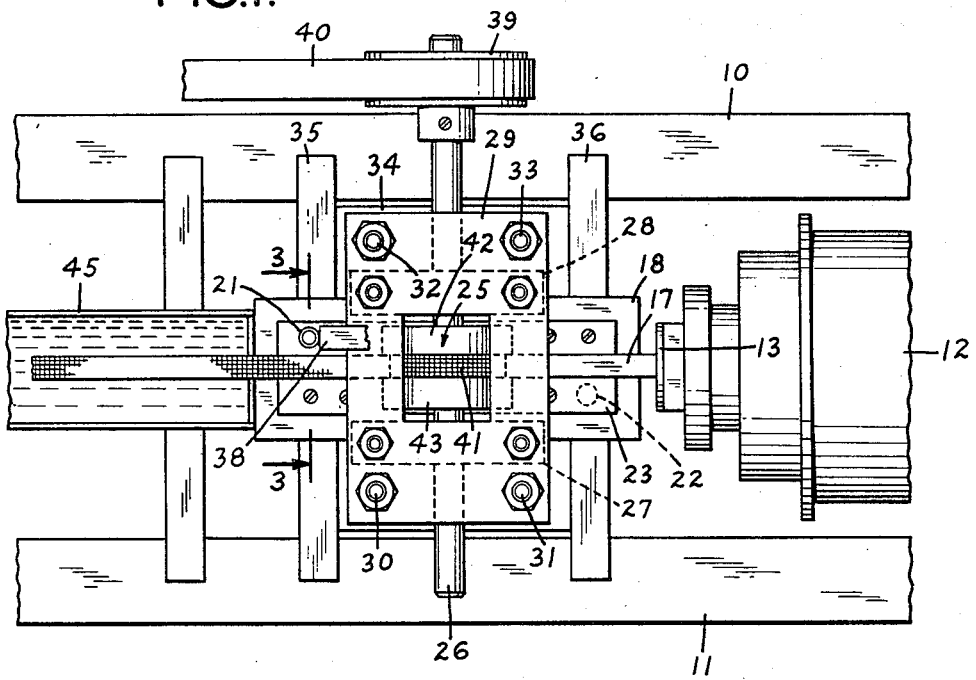
Figure 2:
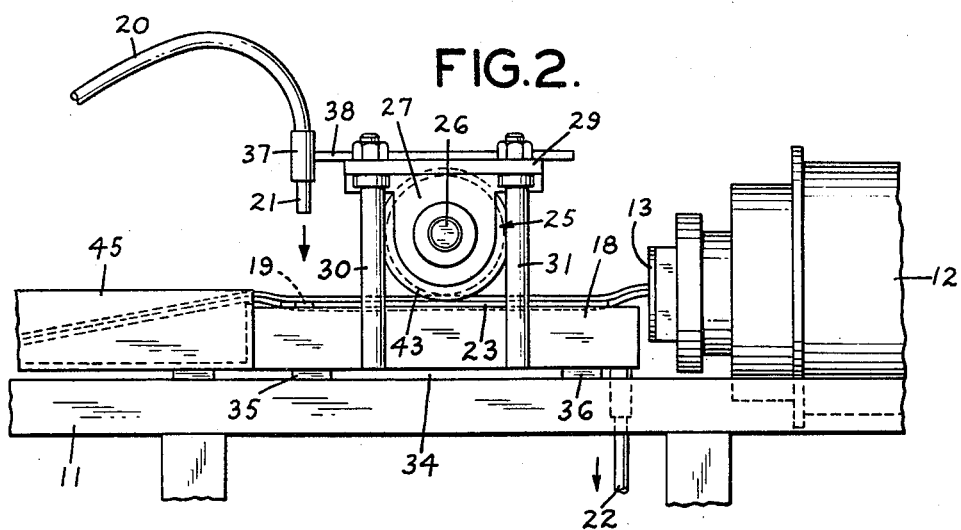
FIGURE 2 is a side elevational view thereof partially broken away.
Figure 3:
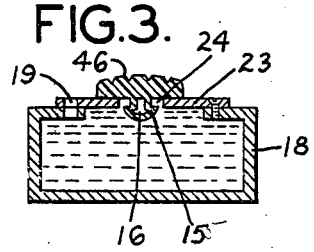
FIGURE 3 is a view in cross-section of a portion of the apparatus taken on line 3—3 of FIGURE 1.

Referring to the drawings, a typical apparatus includes a frame including a pair of frame members 10 and 11 adjacent one end of which is mounted a conventional extrusion cylinder 12 and containing a screw or plunger, not shown, and being suitably heated to render a thermoplastic material sufficiently plastic to enable it to be extruded through an extrusion die 13 having an opening of suitable cross-section. By way of example, the extrusion orifice may be such as to provide a strip having a wide flat body portion 14 and a generally spear-shaped rib 15 on the bottom thereof which may be solid or provided with a longitudinal aperture 16. The upper surface 17 of the strip as extruded. FIGURE 1, may be smooth and flat or slightly convex, as desired. The extrusion cylinder 12 may be mounted on the frame or independently, as desired. Adjacent the die plate 13 is a container or tank 18 for a cooling liquid having an inlet 19 through which cooling liquid may be introduced by means of a hose 20 and nozzle 21 and from which the liquid can be discharged by means of a drain pipe 22, FIGURES 1 and 2. A two-piece cover plate 23 of heat-conductive material, such as brass or copper, is mounted on the upper part of the tank 18 and provides a longitudinally extending slot 24 for receiving the rib 15 so that it is immersed in the cooling liquid in the tank and thus is hardened by contact with the cooling liquid. Also, the undersurface of the T-shaped head on the strip is cooled and solidified by engagement with the cover 23 on opposite sides of the slot 24 and by contact with any liquid which may spill over and out of the slot 24. The upper portion of the T-shaped head remains in a plastic condition.

In order to emboss a pattern on the upper surface 17 of the strip, an embossing roll 25 is mounted above the tank 18 in a position to engage the surface of the strip. The roll 25 is mounted on a shaft 26 received in pillow blocks 27 and 28 attached to a plate 29 which spans the tank 18 and is carried on the upper ends of four supporting rods 30, 31, 32 and 33 either directly connected with the frame members 10 and 11 or to a plate 34 having cross bars 35 and 36 at its ends which are secured to the frame members 10 and 11. The cross bars and the supporting plate 34 support the tank 18.

The nozzle 21 is mounted in a tubular support 37 carried by a bar 38 which also is fixed to the top plate 29 as by welding or the like to position it in alignment with the inlet port 19 of the tank.

As shown in FIGURE 1, the shaft 26 is provided with a pulley 39 driven by means of a belt 40 and a variable speed transmission and motor, not shown, so that the peripheral speed of the embossed area 41 of the embossing roll 25 is equal to the rate of extrusion of the strip of plastic to avoid marring of the surface and blurring of the embossed pattern on the surface 17 of the strip. On opposite sides of the embossed area 41 of the roll are flange portions 42 and 43 of greater diameter than the embossed surface so that the flanges slide against the surface of the plate 23 on the tank and are cooled thereby and also confine the lateral edges of the extruded strip during the embossing action. If desired, the embossing roll can be hollow and cooled by flow of water through it. After passage of the strip beneath the embossing roll and along the top of the tank 18, the entire strip is immersed in a coolant tank 45 also supported on the frame members 10 and 11 in any suitable way so as to congeal the strip and maintain the sharpness of the embossed pattern represented by the checkered surface 46 in FIGURE 4. In this way, not only is the shape of the rib 15 maintained against deformation during the embossing action, but the embossed pattern is also kept sharp and clean and unmarred by any recovery or memory effect on the part of the extruded plastic.

By way of example of a typical process, a strip suitable for the use in grating bars is composed of a vinyl plastic of suitable type such as the standard Goodrich AE 364 manufactured by Goodrich Tire & Rubber Company. The vinyl is extruded at a temperautre of 350° F. and at a rate of approximately twenty feet a minute. The opening in the die 13 is approximately 15% larger in area in a horizontal direction and 5% larger in a vertical direction than the dimensions of the finished strip to compensate for differential cooling of the product. The cooling tank 18 is approximately two inches from the die 13 so that the rib and the bottom of the crosshead 14 of the strip are subjected to immediate cooling. Water is supplied to the cooling bath or tank 18 at a temperature of about 50° F. and at a rate of about four gallons per minute. The embossing roll 25 is spaced approximately three inches from the die plate 13, that is, with an embossing roller five inches in diameter, the center of the roll will be spaced about five and one-half inches from the die plate. As indicated above, the embossing roll 25 is cooled by contact with the brass plate 23 to a temperature of approximately 100° F. At the time the strip engages the roll 25, the top of the strip has a temperature of about 300° F. while the rib 15 has been cooled to about 180° F. The embossing section 40 of the roll has a peripheral speed of twenty feet per minute, thereby being synchronized with the rate of extrusion of the strip through the die 13.

After embossing, the strip contiues along the cooling tank 18 about another two inches and then is immersed in the tank 45 where a water temperature of between 50 and 60° F. is maintained.

Figure 4:
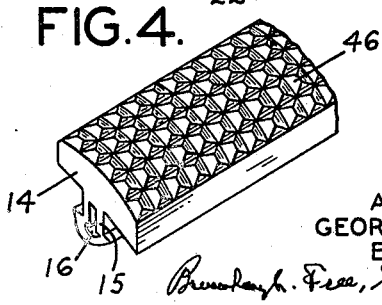
FIGURE 4 is a perspective view of a typical form of embossed extruded strip produced with the apparatus.

By this process, a checkered or other pattern such as that shown in FIGURE 4 having sharply defined edges can be applied to the surface of the strip either in flat form or convexly curved, as shown in FIGURE 4, while the rib 15 is prevented from deforming and the desired dimensions thereof are maintained enabling the strip to be used without further treatment, for example, in gratings and the like of the type described above.

It will be understood that other articles than anti-skid strips for gratings may be made by the process and that the form of the extruded article is susceptible to wide modification, for example, strips or sheets having a plurality of ribs of a desired shape and having the same or different surface ornamentations may be provided by suitable modification of the apparatus.

We claim:

1. A method of making an article having a surface with a sharply defined pattern thereon and a portion extending lengthwise thereof of predetermined cross-sectional shape and dimensions, comprising extruding a strip of heated, plastic thermoplastic resin having at least one substantially smooth surface and an opposite surface having a rib portion extending lengthwise of said strip, immediately after extruding said strip immersing said rib portion in a cold liquid to harden said rib portion, maintain its cross-section shape and shrink it to predetermined dimensions, embossing the plastic smooth surface of the strip with an embossing member to form a sharply defined pattern in said surface, and cooling said strip immediately by immersing it in a cold liquid to fix said pattern therein.

2. The method set forth in claim 1 in which said rib has greater cross-sectional dimensions, as extruded, than said rib after cooling.

3. The method set forth in claim 1 in which said embossing member is moved at a peripheral speed essentially equal to the speed at which said strip is extruded.

4. The method set forth in claim 1 in which said rib is suspended freely in said liquid and the remainder of the strip outwardly of said rib is supported during passage of said smooth surface of said strip in contact with said embossing member.

5. The method set forth in claim 3 in which said rib is suspended freely in said liquid and the remainder of the strip outwardly of said rib is supported during passage of said smooth surface of said strip in contact with said embossing member.

References Cited

UNITED STATES PATENTS

| 2,728,104 | 12/1955 | Fisch | 264—210 X |
| 2,791,801 | 5/1957 | Szantay | 264—327 X |
| 3,038,205 | 6/1962 | Plummer | 264—181 X |
| 3,104,937 | 9/1963 | Wyckoff et al. | 264—178 |
| 3,387,330 | 6/1968 | Lemelson | 264—167 X |

ROBERT F. WHITE, Primary Examiner

K. J. HOVET, Assistant Examiner

U.S. Cl. X.R.

18—12; 264—178, 237, 293